Patented Apr. 6, 1954

2,674,546

UNITED STATES PATENT OFFICE 2,674,546

PORTABLE INSULATED ELECTRICAL CORDS

Milton S. Greenhalgh, Bridgeport, and Stanton C. Martens, New Haven, Conn., assignors to General Electric Company, a corporation of New York No Drawing. Application January 23, 1951, Serial No. 207,436

4 Claims. (Cl. 117—128.4)

This invention relates to portable insulated electrical conducting cords and methods of preparing the same. More particularly, the invention is directed to a non-marring portable insulated electrical cord when in contact with resinous varnished or lacquered surfaces, said cord comprising an electrical conductor containing an outside insulation composed of a vinyl halide resin, a plasticizer for said vinyl halide resin, and a polymeric reaction product of acrylonitrile and butadiene.

One of the objects of the invention is to prepare a portable plasticized insulated electrical conductor which when in contact with lacquered or varnished surfaces, or with plastic articles such as polystyrene, will not cause marking or impairment of the surface.

Another object of the invention is to prepare a portable, flexible, insulated, electrical cord which can be subjected to the rays of ultraviolet light without bleeding or exudation of the plasticizer.

Other objects of the invention will become more apparent from the description thereof which follows:

Portable insulated, plasticized electrical conductors are used extensively in connection with lamps, small appliances such as toasters, clocks (including polystyrene casings for clocks), roasters, etc. In all such cases the cords usually come in contact with some surface which has been protected by means of a varnish, a lacquer, or some other protective coating derived from synthetic or natural-base resins. Many of these cords employ as insulation for the conductor a vinyl halide resin and particularly vinyl halide resins comprising the product of copolymerization of a vinyl halide and a vinyl ester, for example, copolymers of vinyl chloride and vinyl acetate. It has been found desirable to use various plasticizers in combination with such vinyl halide resins including the vinyl halide-vinyl acetate copolymers. Great difficulty, however, has been experienced when these plasticized vinyl halide resins have come in contact with surfaces coated with protective coatings having bases derived from natural or synthetic resins, as, for example, nitrocellulose lacquers, polystyrene surfaces, cellulose acetate surfaces, as well as other types of plastic articles and coated surfaces usually found in protected wooden furniture in the home or office. When such plasticized insulated cords are used, e. g., in connection with lamps and these cords rest on the furniture surfaces, or on any other resin-base surface, it has been found that after a relatively short period of time if the cord should be permitted to lie in one position for any length of time, streaks or marks will become apparent on the coated surfaces as a result of some effect of the plasticized insulated portable cord. This, of course, is a serious defect and has resulted in a limited use of plasticized vinyl halide resins as outside insulation for portable cords to be used in contact with such coated surfaces.

We have now discovered that by substituting a portion of the plasticizer in the vinyl halide resin with a copolymer of butadiene and acrylonitrile, we are able to obviate the above difficulties and to obtain a portable electrical cord whose flexible properties are in no way impaired and whose electrical properties are at least as good as the previously available flexible cords, but with the added advantage that there is no longer any streaking or marking of coated surfaces as a result of the continued contact of the portable cord with such surfaces.

The term "portable cord" will be used hereinafter in the specification and in the claims to denote a flexible insulated electrical conductor in which the outside insulation comprises a vinyl halide resin, for example, a copolymer of vinyl chloride and vinyl acetate in which the vinyl acetate is in a minor proportion, and a plasticizer for said resin which may also contain fillers, stabilizers for the vinyl halide resin, antioxidants, for the butadiene-acrylonitrile, pigments, etc.

The copolymer of butadiene and acrylonitrile may comprise these two ingredients in varying proportions. Generally, we prefer to use butadiene-1,3 and acrylonitrile in which the acrylonitrile comprises from 20 to 45 per cent of the total weight of the acrylonitrile and the butadiene. The use of the butadiene-acrylonitrile copolymer in place of the entire plasticizer for the vinyl halide resin is not satisfactory since it does not meet Electrical Underwriters' specifications as regards tensile strength, elongation, heat-aging characteristics and low temperature flexibility. In addition, it does not permit the proper processing of the vinyl halide compound during extrusion over the conductor while making the portable cords. It is therefore necessary to have both the plasticizer and the butadiene-acrylonitrile copolymer present in the insulation.

The vinyl halide resin may comprise either a homopolymer of a vinyl halide itself, for example, polymers of vinyl chloride, vinylidene chloride, etc., or mixtures of the vinyl halides.

with each other, or mixtures of one or both with minor proportions of other monomers copolymerizable therewith as, for instance, vinyl acetate, vinyl propionate, vinyl butyrate, methyl methacrylate, methyl acrylate, and other similar copolymerizable materials. By minor proportion is meant less than 50 per cent, by weight, of the total weight of monomeric materials prior to copolymerization. We prefer to use a copolymer of vinyl chloride and vinyl acetate in which the vinyl acetate comprises from about 1 to 20 per cent of the total weight of the vinyl ester and the vinyl chloride.

In preparing the material which is to be used as insulation for the portable cord, various plasticizers may be included as, for example, di-(2-ethylhexyl) phthalate, dibutyl phthalate, tricresyl phosphate, acetylated castor oil, chain-stopped polyesters of the type disclosed and claimed in Bohrer application, Serial No. 96,163, filed May 28, 1949, now abandoned and assigned to the same assignee as the present invention, as, for instance, chain-stopped plasticizers obtained by effecting reaction between adipic acid, propylene glycol, and coconut oil fatty acids, in which the latter fatty acids act as esterifying chain-stoppers at each end of the linear ester chain formed by the reaction of the aforesaid propylene glycol and adipic acid, etc.

The relative proportions of the vinyl halide resin (generically hereinafter designated), plasticizer, and butadiene-acrylonitrile copolymer have been found to give the best results when, assuming a 100 per cent weight basis of these three ingredients, the mixture of ingredients comprises from 30 to 65 per cent of the vinyl halide resin, from 15 to 35 per cent of a plasticizer for the latter resin, and from 20 to 40 per cent of the copolymer of butadiene-acrylonitrile. A more narrow range which we have found suitable comprises from 40 to 55 per cent of the vinyl halide resin, from 17.5 to 25 per cent of the plasticizer, and from 25 to 35 per cent of the copolymer of butadiene and acrylonitrile. In general, the optimum properties will depend on such factors as the type of vinyl halide resin employed, the type of plasticizer used, the proportion of acrylonitrile in the butadiene-acrylonitrile copolymer, the type and amount of filler used, etc.

In preparing the insulation composition for the portable electrical conductor which, in most instances will have a copper core, the vinyl halide resin, plasticizer, and copolymer of butadiene and acrylonitrile without any vulcanizing agent, together with stabilizers for the resins as well as any of the well known fillers employed in combination with vinyl halide resins, are preferably mixed together on the usual compounding rolls or Banbury and if desired during such mixing, anti-oxidants for the butadiene-acrylonitrile copolymer may be added together with lubricants for the moldable composition, as well as any desired pigment. Thereafter, this composition may be applied as insulation to the electrical conductor by any of the well known methods as, for instance, by extrusion of the insulation over the wire. This will, of course, require types of equipment which are capable of subjecting the extrudable plasticized resinous composition to the necessary temperature and pressure conditions.

In order that those skilled in the art may better understand how the present invention may be practiced, the following examples are given by way of illustration and not by way of limitation. All parts are by weight.

Example 1

In this example, a resinous mixture was prepared by compounding on rubber compounding (differential) rolls a mixture comprising 38 parts of a vinyl halide resin comprising a copolymer of vinyl chloride and vinyl acetate in which the vinyl acetate comprised about 2.5 per cent of the total copolymer, 15 parts of a chain-stopped plasticizer obtained by effecting reaction between propylene glycol, adipic acid, and coconut oil fatty acids (the said plasticizer being more particularly described and claimed in the aforementioned Bohrer application), 2.30 parts of a stabilizer for the vinyl resin comprising basic lead carbonate $[2PbCO_3.Pb(OH)_2]$, 19.8 parts of a filler comprising finely divided clay, 22 parts of a copolymer of butadiene-1,3 and acrylonitrile in which the latter comprised about 25 per cent of the total weight of the copolymerizable materials, 0.5 part of an antioxidant, specifically a mixture of hydrocarbon-substituted diarylamines and petroleum wax (Agerite gel), 0.30 part of a lubricant, specifically stearic acid, and 2.10 parts of a pigment, specifically titanium dioxide. This resinous mixture was extruded by means of an extruding machine as insulation over a flexible copper core about 25 mils thick. This portable flexible plasticized insulated electrical conductor was subjected to various tests to determine the effect of contact of the insulated conductor with various varnished and lacquered surfaces. In one test the insulated conductor was placed on a varnished surface under about 1 p. s. i. pressure and the effect noticed after 3 days at 25° C., and after 3 days at 60° C. In neither case was any softening or lifting of the varnish apparent. Another test involved applying the insulated portable wire to a surface coated with a nitrocellulose lacquer. After 3 days at 25° C. and 3 days at 60° C., again no softening of the surface in immediate contact with the wire was noticed. Subjection of the insulated wire to ultra-violet rays for 120 hours showed no evidence of exudation of the plasticizer, nor was any exudation noticed even after 314 hours exposure in a weatherometer test. Finally, application of the insulated conductor to a polystyrene surface at room temperature again showed no evidence of any mark on the surface. The insulated wire was almost completely taste-free and did not contaminate water or butter. In contrast to this, when a wire insulated with the same resin and containing, for example, plasticizers such as tricresyl phosphate and acetylated castor oil, which are usual plasticizers for copolymers of vinyl chloride and vinyl acetate, was subjected to the same tests, and the butadiene-acrylonitrile copolymer omitted, in the varnish-lifting test there was notable softening after 3 days at 25° C. and there was a serious removal of the varnish after 3 days at 60° C. In connection with the nitrocellulose lacquer tests, there was severe softening both after 3 days at 25° C. and also after 3 days at 60° C. When this latter insulated conductor was subjected to ultra-violet rays or to the weatherometer test, it was found that the plasticizer exuded after 4 hours in the former test and after 46 hours in the latter test.

When the butadiene-acrylonitrile was substituted entirely by the chain-stopped adipic acid-propylene glycol-coconut oil fatty acids plasticizer so that that latter, by weight, comprised about 40 parts and the vinyl chloride resin 40 parts, the filler, stabilizer, antioxidant, lubricant and pigment remaining the same, the insulated conductor showed the same properties as the tricresyl phosphate plasticized insulation above as regards the varnish lifting, nitrocellulose lacquer and polystyrene tests. The plasticizer exuded after 12 hours in the ultraviolet test and after 70 hours in the weatherometer test.

*Example 2*

In this example a resinous insulating material was prepared in the same manner as was done first in Example 1, with the exception that instead of using 15 parts of the chain-stopped plasticizer employed in Example 1, 15 parts of another plasticizer, specifically di-(2-ethylhexyl) phthalate was used. A copper core was insulated with this plasticized vinyl halide resinous composition containing the butadiene-acrylonitrile copolymer and tested in the same way as was done in Example 1. It was found that the same desirable results were obtained in the varnish and lacquer tests. In addition, there was no evidence of exudation of the plasticizer after more than 100 hours in the ultraviolet ray tests nor after more than 300 hours in the weatherometer test.

*Example 3*

In this example a resinous insulating material was prepared in the same manner as was done first (using the butadiene-acrylonitrile copolymer) in Example 1, with the exception that instead of using 15 parts of the chain-stopped plasticizer employed in Example 1, 15 parts of tricresyl phosphate were employed. An insulated portable cord was prepared in the same way as was done in Examples 1 and 2 and tested similarly as in those examples. The results obtained in all the tests were essentially the same as the results found for the insulated conductor of Examples 1 and 2 containing the butadiene-acrylonitrile copolymer.

In addition to the vinyl halide resin employed in the above-identified examples, it will also be apparent that other vinyl halide resins or copolymers of vinyl halides and other copolymerizable materials, may be employed in place thereof without departing from the scope of the invention. Many examples of such vinyl halide compositions are mentioned above and additional examples may be found, for instance, in D'Alelio Patents 2,378,753 issued June 19, 1945, and 2,299,740 issued October 27, 1942, both patents being assigned to the same assignee as the present invention. Also, other stabilizers commonly known as heat- and light-stabilizers which prevent discoloration of the vinyl halide resin upon exposure to high temperatures or upon prolonged exposure to light, may be added in place of the ones employed in the foregoing examples. Among such stabilizers may be mentioned, for example, PbO, $PbO_3$, $Pb_3O_4$, tribasic lead sulfate, tribasic lead silicate, etc.

Additional anti-oxidants for the butadiene-acrylonitrile copolymer such as dialkyl phenol sulfides, hydroquinone monobenzyl ether, naphthyl amine, etc., may also be used in place of the one shown in Example 1. Such anti-oxidants are essential for heat-aging and resistance to ultraviolet light, and may comprise, e. g., from about 1.0 to 5 per cent, by weight, based on the weight of the butadiene-acrylonitrile copolymer.

Various fillers which may comprise, for instance, from about 0 to 100 per cent by weight, based on the weight of the vinyl halide resin, and pigments commonly used in the rubber and plastics industries may be included in the compositions as, for example, carbon black, barytes, various clays, whiting, etc. Finally, in addition to the plasticizers employed or described previously, others which may be used with the vinyl halide resins may include, for instance, dibenzyl sebacate, di-(2-ethylhexy) azelate, di-(2-ethylhexyl) tetrachlorophthalate, etc.

In admixing the copolymer of butadiene-acrylonitrile with the plasticized vinyl halide resins, we have found that good results are obtained when on a weight basis the copolymer is used in an amount equal to from 0.2 to 1 part thereof per part of the mixture of plasticizer and vinyl halide resin. Within this range, the plasticized and modified vinyl halide resin maintains its desirable flexible condition while at the same time becoming endowed with the new property of showing no effect when the vinyl halide resin in the form of insulation on an electrical conductor is in contact with varnished or lacquered surfaces or in contact with any other resinous surface.

We have also found that unexpectedly the plasticized compositions herein described and employed as electrical insulation are eminently suitable for use as non-contaminating jackets for high frequency cables and as sheet material for simulated leather applications which may be subjected to sunlight or ultraviolet rays.

What we claim as new and desire to secure by Letters Patent in the United States is:

1. A portable, flexible, insulated electrical cord having non-marring and non-staining properties when in contact with resinous, varnished or lacquered surfaces, and being free of surface exudation upon extended exposure to ultra-violet rays, the said cord comprising (1) a copper conductor and (2) an extruded, unvulcanized insulation coating on said conductor, said insulation coating consisting essentially, by weight, of (a) from 30 to 65 per cent of a vinyl chloride resin, (b) from 15 to 35 per cent of a plasticizer for the vinyl chloride resin, (c) from 20 to 40 per cent of a copolymer of butadiene-1,3 and acrylonitrile, the said copolymer being non-vulcanizable and consisting of copolymerized butadiene-1,3 and acrylonitrile in which the acrylonitrile is equal to from 20 to 45 per cent of the total weight of the latter and the butadiene-1,3, and (d) the balance of the insulation being a filler which is present in an amount up to 100 per cent of the weight of the vinyl chloride resin.

2. A portable, flexible, insulated electrical cord having non-marring and non-staining properties when in contact with resinous, varnished or lacquered surfaces, and being free of surface exudation upon extended exposure to ultra-violet rays, the said cord comprising (1) a copper conductor and (2) an extruded unvulcanized insulation coating on said conductor, said insulation coating consisting essentially, by weight, of (a) from 30 to 65 per cent of a vinyl chloride resin, (b) from 15 to 35 per cent of a chain-stopped polyester obtained by the reaction of propylene glycol, adipic acid, and cocoanut oil fatty acids, (c) from 20 to 40% of a copolymer of butadiene-1,3 and acrylonitrile, said copolymer being non-vulcanizable and consisting of copolymerized butadiene-1,3 and acrylonitrile in which the acrylonitrile is equal to from 20 to 45 per cent of the total weight of the latter and the butadiene-1,3, and (d) the balance of the insulation being a filler which is present in an amount up to 100 per cent of the weight of the vinyl chloride resin.

3. A portable, flexible, insulated electrical cord having non-marring and non-staining properties when in contact with resinous, varnished or lacquered surfaces, and being free of surface exudation upon extended exposure to ultra-violet rays, the said cord comprising (1) a copper conductor and (2) an extruded unvulcanized insulation coating on said conductor, said insulation coating consisting essentially, by weight, of (a) from 30 to 65 per cent of a vinyl chloride resin, (b) from 15 to 35 per cent di-(2-ethylhexyl)phthalate, (c) from 20 to 40 per cent of a copolymer of butadiene-1,3 and acrylonitrile, said copolymer being non-vulcanizable and consisting of copolymerized butadiene-1,3 and acrylonitrile in which the acrylonitrile is equal to from 20 to 45 per cent of the total weight of the latter and the butadiene-1,3, and (d) the balance of the insulation being a filler which is present in an amount up to 100 per cent of the weight of the vinyl chloride resin.

4. A portable, flexible, insulated electrical cord having non-marring and non-staining properties when in contact with resinous, varnished or lacquered surfaces, and being free of surface exudation upon extended exposure to ultra-violet rays, the said cord comprising (1) a copper conductor and (2) an extruded unvulcanized insulation coating on said conductor, said insulation coating consisting essentially, by weight, of (a) from 30 to 65 per cent of a vinyl chloride resin, (b) from 15 to 35 per cent of tricresyl phosphate, (c) from 20 to 40 per cent of a copolymer of butadiene-1,3 and acrylonitrile, said copolymer being non-vulcanizable and consisting of copolymerized butadiene-1,3 and acrylonitrile in which the acrylonitrile is equal to from 20 to 45 per cent of the total weight of the latter and the butadiene-1,3, and (d) the balance of the insulation being a filler which is present in an amount up to 100 per cent of the weight of the vinyl chloride resin.

References Cited in the file of this patent

UNITED STATES PATENTS

| Number | Name | Date |
|---|---|---|
| 2,330,353 | Henderson | Sept. 18, 1943 |
| 2,552,904 | Newberg | May 15, 1951 |

FOREIGN PATENTS

| Number | Country | Date |
|---|---|---|
| 615,256 | Great Britain | Jan. 4, 1949 |

OTHER REFERENCES

Kenney, Integrating Plastic and Rubber Industries: Modern Plastic; Sept. 1946, pgs. 106–107.

Young et al., Synthetic Elastomers as Plasticizers for Polyvinyl Resins; Ind. and Eng. Chemistry, Nov. 1947, pgs. 1446–1452.